Patented Oct. 27, 1931

1,829,672

UNITED STATES PATENT OFFICE

BERNHARD RICHARD, OF BASEL, SWITZERLAND, ASSIGNOR TO FIRM OF J. R. GEIGY S. A., OF BASEL, SWITZERLAND

MANUFACTURE OF SUBSTANTIVE POLYAZO-DYESTUFFS

No Drawing. Application filed November 17, 1930, Serial No. 496,336, and in Germany November 29, 1929.

This invention relates to the manufacture of valuable polyazo-dyestuffs which dye cotton blue tints of outstanding fastness to light, by coupling the diazo-compound of a disazo-dyestuff of the type:

$$A-N=N-M_1-N=N-M_2-NH_2,$$

in which A represents the residue of a benzene or naphthalene sulphonic or carboxylic acid and $M_1$ and $M_2$ represent the residue of α-naphthylamine, 1-naphthylamine-6-sulphonic acid, 1-naphthylamine-7-sulphonic acid or a mixture of both of these, with a mono-azo-dyestuff obtainable by coupling in acid solution a diazo-body with 2:5-amino-naphthol-7-monosulphonic acid. The new dyestuffs probably correspond with the following formula:

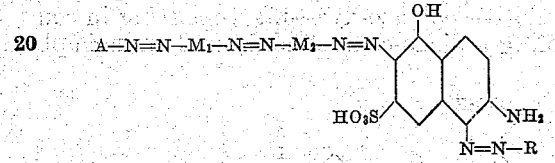

(R=residue of a benzene or naphthalene derivative)

Dyestuffs of the composition:

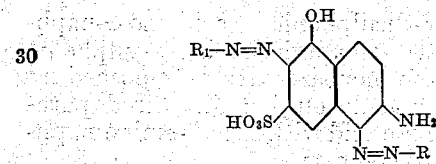

are already disclosed in German Patent No. 126802. Among the numerous examples and the many dyestuffs named in the table of this specification there are to be found, however, only representatives, in which $R_1$ of the above formula is a residue of a simple benzene or naphthalene derivative or the residue of a monoazo-dyestuff. Correspondingly the tints obtained are predominantly light, that is to say, orange red, violet to reddish blue, whereas the dyestuffs of the present invention yield greenish blue tints. In contrast with the dyestuffs of the German Patent No. 126802, which all have little fastness to light, the dyestuffs of the present invention are characterized by their outstanding fastness to light.

The following examples illustrate the invention the parts being by weight:—

Example 1

The diazo-compound from 20.8 parts of 4-chloro-1-amino-benzene-3-sulphonic acid is coupled in acetic acid solution with 24.5 parts of sodium 1-naphthylamine-7-sulphonate. The product is diazotized further, the diazo-body is isolated and coupled with 24.5 parts of Clève's acid 1:7 or Clève's acid 1:6, or a mixture of these acids in presence of an excess of sodium acetate. The dyestuff produced is isolated, re-dissolved and again diazotized. The diazo-compound thus obtained is then introduced into a solution, containing 50 parts of sodium carbonate, of the dyestuff which is obtainable by coupling 17.3 parts of diazotized metanilic acid with 24 parts of 2:5:7-amino-naphtholmonosulphonic acid in an acid solution. When coupling is finished, the whole is heated and the dyestuff salted out. It dyes cotton directly greenish-blue tints of characteristic fastness to light.

The dyestuff in its free state has probably the following formula:

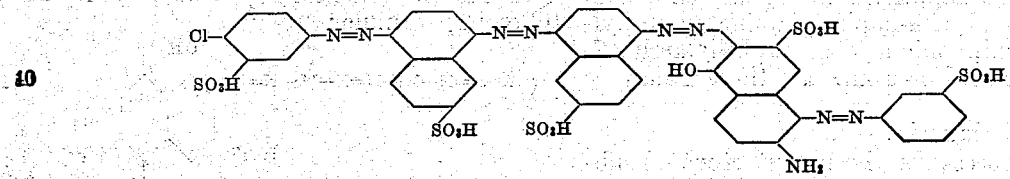

Instead of the 4-chloro-1-aminobenzene-3-sulphonic acid used as initial component, other sulphonic or corbaxylic acids of the benzene or naphthalene series may be used, such as for example metanilic acid, sulphanilic acid, toluidine sulphonic acid, nitraniline sulphonic acid, aniline disulphonic acid, amino-benzoic acid, naphthionic acid, naphthylamine disulphonic acids and so on. Likewise, instead of the metanilic acid coupled in acid solution with the 2:5:7-aminonaphtholsulphonic acid, other bases, sulphonic or carboxylic acids of the benzene or naphthalene series may be used, such as for example aniline, chloraniline, toluidine, nitraniline, sulphanilic acid, nitraniline sulphonic acid, aminobenzoic acid, naphthionic acid, paraaminosalicylic acid and so on.

*Example 2*

30.3 parts of 2-aminonaphthalene-4:8-disulphonic acid are diazotized and coupled in known manner with 15 parts of α-naphthylamine. The dyestuff thus obtained is further diazotized and coupled with 24.5 parts of sodium 1-naphthylamine-7-sulphonate. The dyestuff is isolated and again diazotized. The diazo-body produced is introduced into a solution, containing an excess of sodium carbonate, of the dyestuff obtainable by acid coupling of 15.3 parts of diazotized para-amino-salicylic acid with 24 parts of 2:5:7-aminonaphtholsulphonic acid. When coupling is complete, the whole is warmed and the dyestuff salted out and isolated. It dyes cotton green blue tints very fast to light. By after-treatment with copper and chromium salts, the dyeings become redder and more fast to washing.

The dyestuff in its free state has probably the following formula:

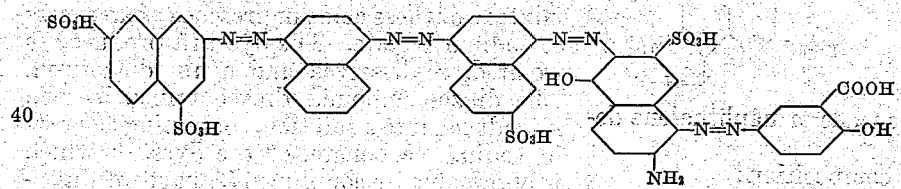

Instead of the 2-amino-naphthalene-4:8-disulphonic acid used as initial component, other sulphonic carboxylic acids of the benzene or naphthalene series can be used, such as for example chloraniline sulphonic acid, metanilic acid, sulphanilic acid, toluidine sulphonic acid, nitraniline sulphonic acid, aniline disulphonic acid, naphthionic acid, 1:3:6-naphthylamine disulphonic acid etc. Instead of α-naphthylamine, naphthylamine-6-sulphonic acid or naphthylamine-7-sulphonic acid or a mixture thereof may be used.

What I claim is:—

1. A process for the manufacture of substantive polyazo-dyestuffs, consisting in coupling a diazo-compound of a disazo-dyestuff of the type $A-N=N-M_1-N=N-M_2-NH_2$, in which A is the residue of a benzene or naphthalene sulphonic or carboxylic acid and $M_1$ and $M_2$ are the residue of α-naphthylamine or 1-naphthylamine-6-or-7-sulphonic acid, with a monoazo-dyestuff obtainable by coupling in acid solution a diazo body of the benzene and naphthalene series with 2:5-aminonaphthol-7-monosulphonic acid.

2. A process for the manufacture of substantive polyazo-dyestuffs, consisting in coupling a diazo-compound from 4-chloro-1-amino-benzene-3-sulphonic acid-azo-1-naphthylamine-7-sulphonic acid-azo-1-naphthylamine-6-sulphonic acid with a monoazo dyestuff obtainable by coupling in acid solution a diazo body of the benzene and naphthalene series with 2:5-aminonaphthol-7-monosulphonic acid.

3. A process for the manufacture of substantive polyazo-dyestuffs, consisting in coupling a diazo-compound from 4-chloro-1-amino-benzene-3-sulphonic acid-azo-1-naphthylamine-7-sulphonic acid-azo-1-naphthylamine-6-sulphonic acid with the monoazo dyestuff obtained by coupling in acid solution diazotized metanilic acid with 2:5:7-aminonaphthol-monosulphonic acid.

4. A process for the manufacture of substantive polyazo-dyestuffs, consisting in coupling a diazo-compound from 2-aminonaphthalene-4:8-disulphonic acid-azo-α-naphthylamine-azo-1-naphthylamine-7-sulphonic acid with a monoazo dyestuff obtainable by coupling in acid solution a diazo body of the benzene and naphthalene series with 2:5-aminonaphthol-7-monosulphonic acid.

5. A process for the manufacture of substantive polyazo-dyestuffs, consisting in coupling a diazo-compound from 2-aminonaphthalene-4:8-disulphonic acid-azo-α-naphthylamine-azo-1-naphthylamine-7-sulphonic acid with the monoazo-dyestuff obtained by coupling in acid solution diazotized para-amino-salicylic acid with 2:5:7-amino-naphtholmonosulphonic acid.

6. As new articles of manufacture, the hereinbefore described substantive polyazo-dyestuffs corresponding probably with the following formula:

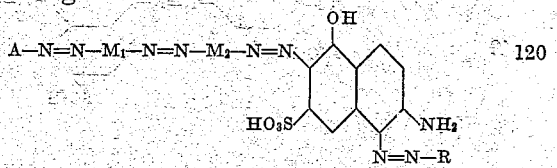

wherein A represents the residue of a benzene or naphthalene sulphonic or carboxylic acid, $M_1$ and $M_2$ represent the residue of α-naphthylamine, 1-naphthylamine-6-sulphonic acid, 1-naphthylamine-7-sulphonic acid or a mixture thereof and R represents a residue of a benzene or naphthalene derivative, said dyestuffs dyeing cotton directly greenish-blue tints of remarkable fastness to light.

7. As new articles of manufacture, the hereinbefore described substantive polyazodyestuffs corresponding probably with the following formula:

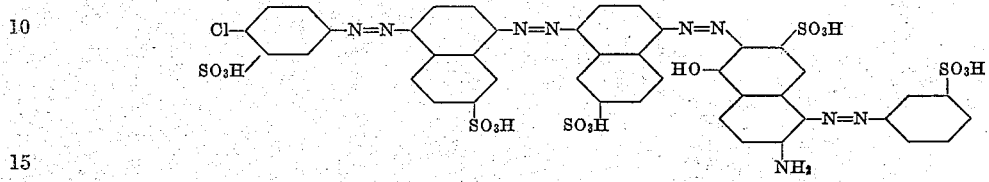

said dyestuffs dyeing cotton directly greenish-blue tints of characteristic fastness to light.

8. As new articles of manufacture, the hereinbefore described substantive polyazodyestuffs corresponding probably with the following formula:

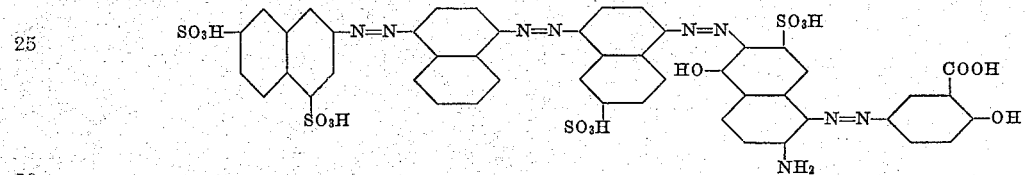

said dyestuffs dyeing cotton green-blue tints very fast to light.

In witness whereof I have hereunto signed my name this 6th day of November, 1930.

BERNHARD RICHARD.